United States Patent [19]

Yoshida

[11] 4,248,344
[45] Feb. 3, 1981

[54] TAPE CASSETTE

[75] Inventor: Masahide Yoshida, Hachioji, Japan

[73] Assignee: Olympus Optical Company Limited, Tokyo, Japan

[21] Appl. No.: 959,752

[22] Filed: Nov. 13, 1978

[30] Foreign Application Priority Data

Nov. 15, 1977 [JP] Japan .................... 52-153243[U]

[51] Int. Cl.³ ................................ B65D 85/672
[52] U.S. Cl. ............................ 206/387; 220/23.4
[58] Field of Search .......... 206/387, 316; 220/23.4, 220/23.6; 242/55.19 A

[56] References Cited

U.S. PATENT DOCUMENTS

| | | | |
|---|---|---|---|
| 1,976,622 | 10/1934 | McIntyre | 220/23.4 |
| 3,381,810 | 5/1968 | Lasher et al. | 206/387 |
| 3,424,334 | 1/1969 | Goltz | 220/23.6 |
| 3,506,321 | 4/1970 | Hampel | 220/23.4 |
| 3,701,079 | 10/1972 | Bowden et al. | 220/23.4 X |
| 3,840,142 | 10/1974 | Tsukada | 206/387 X |
| 3,952,906 | 4/1976 | Georgopulos | 220/23.6 X |

FOREIGN PATENT DOCUMENTS 2330631  1/1974  Fed. Rep. of Germany .......... 206/387

*Primary Examiner*—Joseph Man-Fu. Moy
*Attorney, Agent, or Firm*—Toren, McGeady and Stanger

[57] ABSTRACT

A tape cassette is formed with a housing having a pair of projecting members extending therefrom and with a pair of engaging recesses in order to enable the tape cassette to be releasably joined with other similar cassettes by engagement of the engaging recesses between projection members of adjacent cassettes, the projection members being spaced to enable engagement therebetween of engaging recesses of similarly formed cassettes.

3 Claims, 3 Drawing Figures

4,248,344

TAPE CASSETTE

BACKGROUND OF THE INVENTION

The present invention relates to a tape cassette formed to be directly coupled with a plurality of other similar cassettes.

SUMMARY OF THE INVENTION

The present invention is directed toward providing a tape cassette which can be directly coupled with other cassettes of similar structure without requiring a cassette case for storage of the cassettes, which features a simple construction which avoids entry of dirt and dust to the tape cassette by enabling the cassette to be arranged with the opening portions thereof facing downwardly and which is economical to produce. In accordance with the present invention, a tape cassette is provided which comprises a housing having front and rear walls extending in juxtaposed parallel planes and edge walls defining together with the front and rear walls a cassette interior having magnetic tape accommodated therein. A pair of projection members extend from the edge walls beyond the housing and a pair of engaging recesses are formed in the edge walls. The engaging recesses are adapted to be engaged between projection members of another cassette similar to the cassette upon which the engaging recesses are formed. Similarly, the projection members of the cassette are adapted to engage therebetween the engaging recesses of another cassette which is to be mounted with the cassette. As a result, the cassette of the present invention may be releasably mounted together with a plurality of other adjacent similarly structured cassettes in order to provide a means for convenient storage thereof.

DESCRIPTION OF THE PREFERRED EMBODIMENT

Figure 1:
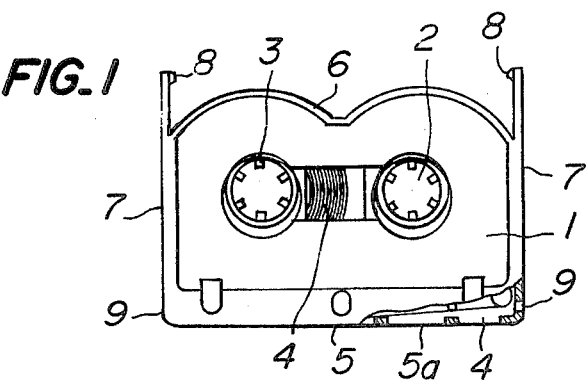
FIG. 1 is a plan, partly broken view showing one embodiment of a tape cassette according to the present invention.

Referring now to the drawings, wherein similar reference characters designate similar or corresponding parts throughout the several views, there is shown a tape cassette according to the present invention. A housing 1 formed of synthetic resin or the like is, as shown in FIGS. 1 and 2, provided with at least a pair of tape hubs 2, 3 and a magnetic tape 4 fixed to these hubs 2, 3 at both ends.

Figure 2:
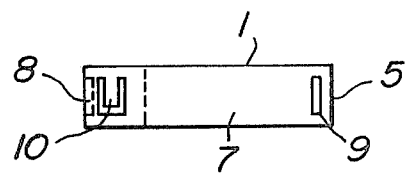
FIG. 2 is a side view of the same embodiment.

The housing is formed with planar front and rear walls each parallel to the plane of the drawing, as seen in FIG. 1, and with edge walls defining together with the front and rear walls the cassette interior containing the tape 4.

On a bottom edge wall 5 of the housing 1 is formed an opening portion 5a for inserting a recording and reproducing head, an erasing head, a pinch roller and the like and a top edge wall 6 is formed in the shape of an arc in accordance with a diameter of the tape.

A pair of side edge walls 7 of the housing 1 are further projected from a point of intersection with the edge wall 6, and they extend from the edge walls beyond the housing to form a pair of projection members 8.

A pair of engaging recesses 9 corresponding to the projecting members 8 are formed on the edge walls 7 by boring a groove at the adjacent positions.

In addition, reference numeral 10 designates a lug for preventing erroneous erasing.

Figure 3:
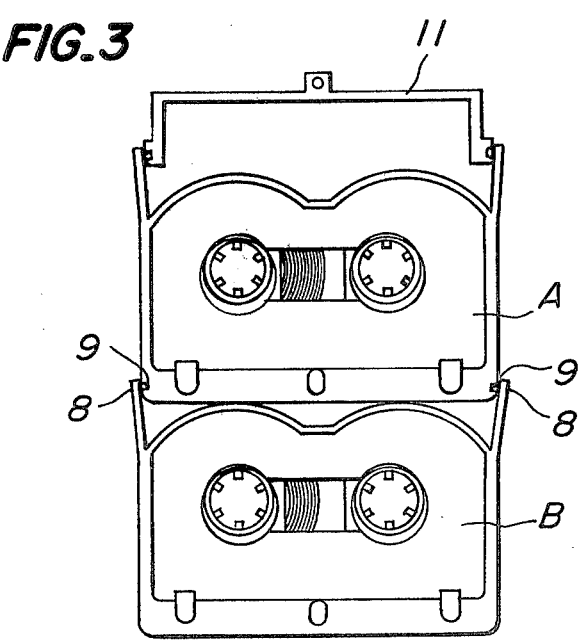
FIG. 3 is an explanatory diagram of the same embodiment.

The tape cassette thus formed is, as shown in FIG. 3, coupled another similar cassette by engaging the projection members 8 of a second cassette B with the engaging recesses 9 of a first cassette A which may be simultaneously coupled to a holder 11 having engaging recesses similar to the recesses 9. In this case, the size and configuration of the tape cassettes are the same but the coupling is made with the aid of elasticity of the projection members 8 projected from the edge wall 6, so that the cassette is positively and firmly coupled by resiliency of the edge wall 6 pressed and widened at the time of coupling. Therefore, such coupling is not easily released by even a slight oscillation or extension.

Further, the cassette is hung by the holder 11, so that the opening portion of the tape cassette faces downwardly thereby avoiding entry of dirt and dust and eliminating maintenance problems.

Of course, it should be understood that the present invention is not limited to the embodiment described above since the projecting members and the engaging recesses may be formed in other specific configurations, pursuant to the invention, which will enable a plurality of cassettes to be coupled together by coupling means formed integrally with the cassette housing.

As described above, in accordance with the present invention, a tape cassette having a simple construction may be directly coupled with a plurality of similar cassettes thereby reducing space requirements and providing excellent economic advantages.

While specific embodiments of the invention have been shown and described in detail to illustrate the application of the inventive principles, it will be understood that the invention may be embodied otherwise without departing from such principles.

What is claimed is:

1. A tape cassette for use in minature tape recorders adapted to be releasably mounted together with a plurality of other similarly structured cassettes comprising: a housing having front and rear walls extending in juxtaposed parallel planes and edge walls defining together with said front and rear walls a cassette interior having magnetic tape accommodated therein; a pair of projection members extending in generally parallel opposed relationship from ends of an opposite pair of said edge walls on opposite sides of said housing; said projection members being formed essentially as integral extensions of each of said pair of edge walls, respectively, with said projection members each including a protuberance thereon arranged to extend from a side thereof facing toward the other of said projection members; a pair of engaging recesses formed in said edge walls, each of said recesses formed, respectively, on the same pair of said edge walls from which said projection members extend, said engaging recesses each being formed proximate an end of one of said pair of edge walls, respectively, opposite the end from which said projection members extend, each of said recesses being configured to receive said protuberances in releasable engagement therein; and a lug for preventing erroneous erasure of said tape formed along one of said pair of edge walls; said pair of projection members being arranged to define therebetween a spacing dimensioned to enable said projection members to receive in releasable mounting engagement therebetween a similar cassette having a configuration and dimensions like those of said tape cassette and including a similar pair of said engaging recesses and said projection members, said cassette being structured so that said similar cassette is engaged and held between said projection members with a resilient spring force; said pair of engaging recesses being adapted to be received between another pair of projection members similar to said pair of projection members and formed in another similar cassette having a configuration and dimensions like those of said tape cassette; said tape cassette being thereby adapted to be releasably mounted together with said similar cassette, with said similar pair of engaging recesses received between said pair of projection members, and with said another similar set, with said pair of engaging recesses received between said another pair of projection members.

2. A tape cassette according to claim 1 wherein said similar cassette is mounted on a holder having formed therein a pair of similar engaging recesses having a spacing and configuration identical with the engaging recesses formed on said tape cassette, said similar cassette being mounted by engagement of said similar engaging recesses of said holder between a pair of said projection members on said similar cassette.

3. A tape cassette assembly adapted to releasably mount together a plurality of similarly structured cassettes for use in miniature tape recorders comprising a plurality of cassettes each including a housing having front and rear walls extending in juxtaposed parallel planes and edge walls defining together with said front and rear walls a cassette interior having magnetic tape accommodated therein; a pair of projection members extending in generally parallel opposed relationship from ends of an opposite pair of said edge walls on opposite sides of said housing of each of said cassettes; said projection members being formed essentially as integral extensions of each of said pair of edge walls, respectively, with said projection members each including a protuberance thereon arranged to extend from a side thereof facing toward the other of said projection members; a pair of engaging recesses formed in said edge walls of each of said cassettes, each of said engaging recesses being formed, respectively, on the same pair of said edge walls from which said projection members extend, said engaging recesses each being formed proximate an end of one of said pair of edge walls, respectively, opposite the end from which said projection members extend, each of said recesses being configured to receive said protuberances in releasable engagement therein; a lug for preventing erroneous erasure of said tape formed along one of said pair of edge walls; and a holder having formed therein a pair of similar engaging recesses having a spacing and configuration identical with the engaging recesses formed on each of said plurality of tape cassettes; said tape cassettes being mounted together in an assembled array with one of said cassettes having the projection members thereof engaged with said similar engaging recesses of said holder in order to mount said cassette upon said holder, and with the other of said cassettes each having at least one of said pair of projection members thereof and said pair of engaging recesses thereof in mounted engagement with at least one of the pair of engaging recesses and pair of projection members, respectively, of another of said plurality of cassettes.

* * * * *